March 12, 1940.  H. G. PHELPS  2,193,324
ELECTRIC MOTOR
Filed April 6, 1936    2 Sheets-Sheet 1

INVENTOR
HUGH G. PHELPS
ATTORNEY

March 12, 1940.  H. G. PHELPS  2,193,324

ELECTRIC MOTOR

Filed April 6, 1936  2 Sheets-Sheet 2

INVENTOR
HUGH G. PHELPS
BY
ATTORNEY

Patented Mar. 12, 1940

2,193,324

UNITED STATES PATENT OFFICE 2,193,324

ELECTRIC MOTOR

Hugh G. Phelps, Milwaukee, Wis.

Application April 6, 1936, Serial No. 72,845

2 Claims. (Cl. 172—283)

This invention relates to electric circuits by which a single phase electric current may be made to produce a plurality of currents approximating a true multiple phase current, and to produce such a current with a minimum of power loss.

It is a further object to produce a practical three phase current from a single phase source in which the lagging component of one phase balances the leading component of another phase so that the net effect upon the single phase line is a current having a high power factor.

It is a further object to produce a practical three phase current in which the maximum effect of the power of the single phase line may appear as useful work in the three phase line so that three phase apparatus may be operated with a minimum of heating and of power loss.

It is a further object to produce an apparatus in which the single phase electric current may be directly used in a three phase electric motor with a maximum of power output in proportion with the power input and the size of the motor and with a maximum power factor in the single phase line.

It is a further object to provide a self-starting motor operated from a single phase line which will operate with a maximum power factor and torque and with a minimum of loss.

It is a further object to provide a motor operated from a single phase line which may be operated at varying speeds and at high efficiency at its different speeds and which may be reversed and operate efficiently in either direction.

It is a further object to provide a self-starting motor operating from a single phase line which will be of smaller dimensions and lighter weight than existing motors, and which will be durable and rugged and which will require no commutator, shading coils or brushes.

It is a further object to provide a motor which will be simple in construction, inexpensive in manufacture and which will be suitable to a wide variety of uses.

Single phase motors have generally depended on the principle of splitting the phase to produce a distorted revolving field in which an induction armature can rotate, or else have depended upon a commutator to produce the starting torque by induction from the rotor. The first of these systems has required a very considerable power loss in the splitting of the phase of the field circuit. This has resulted in high losses within the motor and a low power factor in the current taken from the power line. The commutator type of motor has produced considerable trouble at the commutator, both forms of motor have been bulky and heavy. Neither of these types of motor is very well adapted for use as a reversible motor and when designed for reversing have been inefficient.

In accordance with this invention I have discovered that a single phase current may be converted into a three phase current by the mutual inductive reaction between a plurality of circuits. This result was accomplished by arranging circuits in a mutually inductive relation and imposing a leading current upon one of them, the inductive effect being so arranged as to assist in increasing the displacement between the current in the leading and lagging phases. This method of producing a three phase current is particularly adapted for use in a three phase electric motor operated from a single phase line. I have therefore chosen such a motor as the best manner of illustrating this invention. Moreover, the production of such a motor is one of the important objects of this invention.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description, taken in connection with the accompanying drawings, in which.

Figure 1:
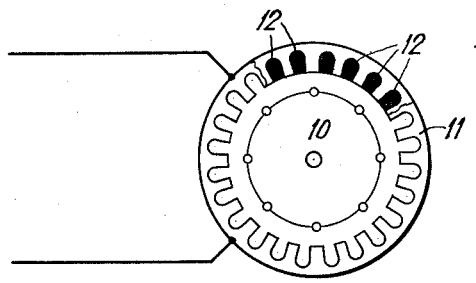
Figure 1 is a diagrammatic elevation of a motor embodying this invention.

In the carrying out of this invention I have provided three separate electric circuits which may be designated as circuits A, B, and C, circuit B being arranged in positive inductive relation to circuits A and C, circuit C being arranged in inverse inductive relation to circuit A, thus by imposing a leading current upon the circuit A or the circuit C and by imposing normal voltage upon circuits B and C, the inverse inductive effect of the leading current in circuit A serves to produce a current in circuit B which lags to a greater extent than would normally be the case if no current were flowing in circuit A.

With such a set of circuits, if the value would be properly chosen, the lagging effect in the circuit B and leading effect in the circuit A may be brought almost, if not entirely, to a 60° value, which corresponds to a true three phase relationship. Moreover, the more nearly such a condition can be approached, the more nearly do we reach the conclusion that the leading component of circuit A counterbalances the lagging component of circuit B, resulting in a substantially 100% power factor from the two.

The exact explanation of the results attained is not wholly clear but the results are quite definite and I hereby give what appears to be the best and most definite explanation as I now understand them.

In the drawings the numeral 10 designates a rotor and the numeral 11, the stator of an electric motor embodying this invention. For this purpose I have chosen to illustrate the rotor as of the familiar squirrel cage type and the stator as of the common slotted type having 24 slots divided into four poles and receiving the field coils 12.

Figure 2:
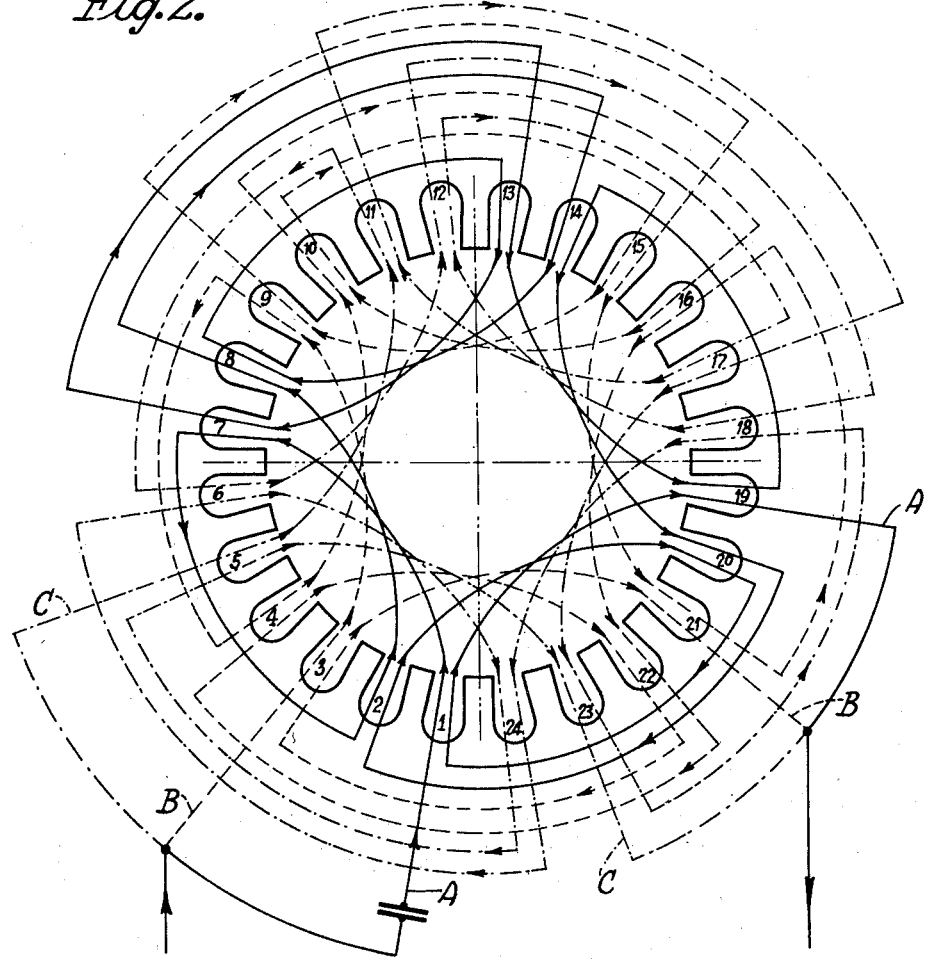
Figure 2 is a diagrammatic view showing the winding of the stator.

The manner of winding and connecting the stator field coils in the embodiment chosen for illustration is more particularly shown in Figure 2, from which it will be seen that the stator is wound with three separate and independent windings occupying successive sets of slots within the same pole area. As shown, the circuit A occupies slots 1, 2, 13, and 14 in a positive direction and slots 7, 8, 19 and 20 in a negative direction. Similarly circuit B occupies slots 3, 4, 15, and 16 positively, and slots 9, 10, 21 and 22 negatively, and circuit C occupies slots 5, 6, 17 and 18 positively, and slots 11, 12, 23 and 24 negatively. While I have illustrated for the sake of simplicity these circuits as occupying separate slots, it will be understood that any form of winding may be adapted in which the properly mutually inductive relation between the circuits is attained.

With the construction above outlined it will be seen, if the circuits be placed in parallel, the inductive effect of the circuit B is positive upon both of the circuits A and C, but the inductive effect of the circuit C upon the circuit A is negative, that is where the circuits A and C appear in adjacent slots the current is flowing in the reverse direction. This circuit B which has positive relation to both A and C may be regarded as the central circuit, and the circuits A and C may be regarded, for convenience, as the lateral circuits. If now a leading current be imposed upon the circuit A, its inductive effect upon the circuit C is to bring that current more nearly in phase with its own voltage. The inductive effect upon the circuit B, however, being in the opposite direction, is to increase the lagging component of that circuit, thereby producing a phase displacement therein directly opposite to the phase displacement in the circuit A, thus nearly approaching a true three phase current.

In the drawings I have shown a condenser 113 inserted in the circuit A. The value of this condenser is more easily determined by experiment and is easily adjusted to give the effect desired.

The direction of rotation of the revolving field, and hence the direction of rotation of the motor, is determined by the location of the condenser 113 in the circuits A or C. This principle enables me to make a reversing motor by the use of a switch such as that shown in Figure 3. In this figure the circuits are shown spread out in delta form, for convenience of illustration, but it will be understood that this is diagrammatic only, and it is intended that the three circuits shall be placed in the relatively mutually inductive relation heretofore described, as for example by being placed in the slots of the stator of the motor field I have shown in Figures 1 and 2.

Figure 3:
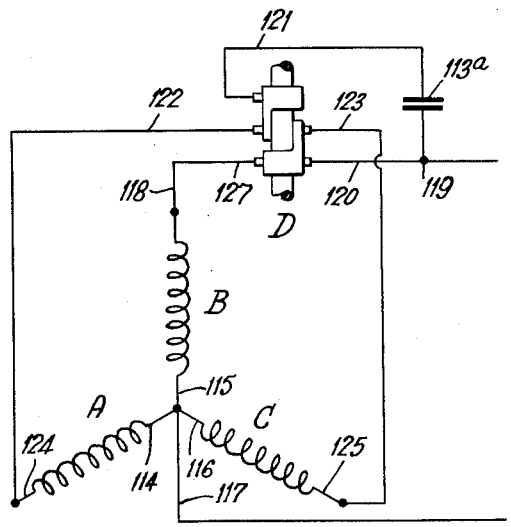
Figure 3 is a form of switch for use with the reversing motor.

In the construction of Figure 3, one side, 114, 115, and 116 of each of the circuits A, B, and C respectively, may be connected directly to the line as shown at 117, and the opposite end 118 of the circuit B is also connected directly to the line at 119, subject, of course, to such switches and control apparatus as may be desired. If the motor is not reversing the circuit C will be connected direct to 119 and condenser 113 may be permanently connected in one circuit, but if the motor is to be reversible this may be accomplished by the use of a switch such as that shown in Figure 3. This switch comprises a double throw switch D, having two common contacts 120 and 121. One of these contacts 121 is connected through a condenser 113a to the line at 119, the other of these common contacts 120 is connected directly to the line at 119. The switch D has also two alternative contacts 122 and 123, contact 122 being connected to the end 124 of the circuit A, and 123 being connected to the end 125 of the circuit C, the switch being arranged in one position to connect contact 121 with contact 120 aand to connect contact 121 with contact 123, thus putting the condenser in series with the circuit A and connecting the circuit C directly across the line through 123—120, whereas with the switch thrown in the opposite direction as shown, contact 121 is connected with 122, and contact 123 is connected with 120 to put the condenser in series with the circuit C and connect circuit A directly across the line. A fifth contact 127 is connected to the end 118 of the circuit B and is arranged to connect the end 118 with the line 119 in either extreme position of the switch.

In this manner the switch D controls the operation and the direction of rotation of the motor. This motor operates quietly and efficiently and may readily be brought to speed in both directions, and in the smaller size it may be reversed at full speed by merely throwing the switch D.

I have found that the speed of the motor may be controlled by varying the capacity of the condenser and any suitable means may be employed, if desired, for varying this capacity in actual practice.

Figure 4:
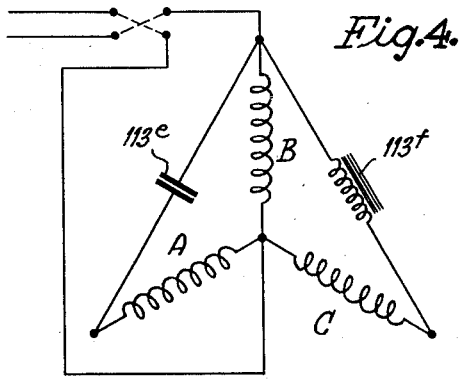
Figure 4 is a modification.

The obtaining of the greatest efficiency in a motor in accordance with this invention, depends on a proper coordination of the reactance of the windings with the mutual inductance of the circuits and capacity of the condenser. This involves the consideration of many factors which are difficult to evaluate with accuracy. It will therefore ordinarily be preferable to select the values by simple experiments. In some cases it may be found desirable to increase the inductance of the windings A or C by inserting an inductive winding in series therewith. In other cases it may be found desirable to increase the number of turns upon the circuit in series with the condenser, thus making it possible to utilize a condenser of smaller capacity, although of higher voltage. Such a motor as illustrated in Figure 4, in which a condenser 113e is placed in series with the winding A and an inductance 113f is placed in series with the winding C.

The motors constructed in accordance with the invention here disclosed may be made of much smaller bulk with the capacity than has been customary heretofore. They come to speed very readily, have good starting torque, and operate efficiently and with high power factor.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An alternating current motor adapted to be energized from a single phase alternating current source, comprising a three phase wound primary member, a secondary member, said members being mounted for relative rotation and for inductive relation, and a condenser, said primary member comprising in rotation three field windings A, B and C, means adapted to electrically connect a similar end of each winding to one conductor of the source, means adapted to electrically connect the other ends of windings B and C to the other conductor of the source, and means adapted to electrically connect the other end of said winding A to the last mentioned conductor in series with the condenser.

2. An alternating current motor adapted to be energized from a single phase alternating current source, comprising a three phase wound, Y-connected, primary member, having in rotation at least three field windings A, B, C, with similar winding terminals forming a neutral point, a secondary member, said members being mounted for relative rotation and for inductive relation, and a condenser, means adapted to connect one conductor of the source to the neutral point of the windings, means adapted to connect the other conductor of the source to the other terminals of winding B and alternatively to windings A and C directly or in series with the condenser, respectively.

HUGH G. PHELPS.